(No Model.)

F. FISHER.
ANIMAL POKE.

No. 519,994. Patented May 15, 1894.

WITNESSES:
Charlie Watson.
Fannie Robbins.

Ferdinand Fisher INVENTOR

BY
ATTORNEY

UNITED STATES PATENT OFFICE.

FERDINAND FISHER, OF CHESANING, MICHIGAN.

ANIMAL-POKE.

SPECIFICATION forming part of Letters Patent No. 519,994, dated May 15, 1894.

Application filed January 11, 1893. Serial No. 458,040. (No model.)

*To all whom it may concern:*

Be it known that I, FERDINAND FISHER, a citizen of the United States, residing at Chesaning, in the county of Saginaw and State of Michigan, have invented certain new and useful Improvements in Animal-Pokes; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to animal pokes, and consists in the construction and arrangements of the parts shown and described.

Figure 1:
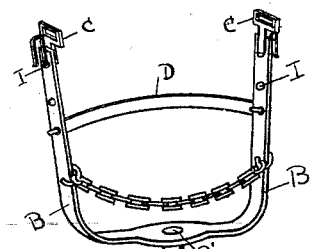
Figure 2:
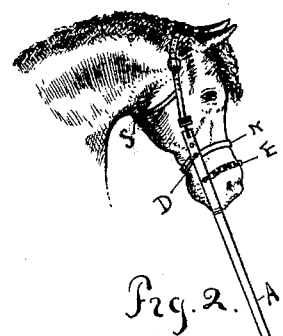
Figure 3:
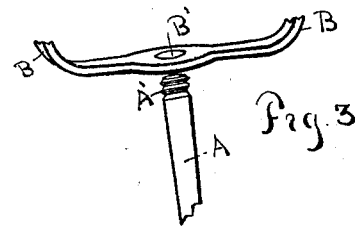
Figure 4:
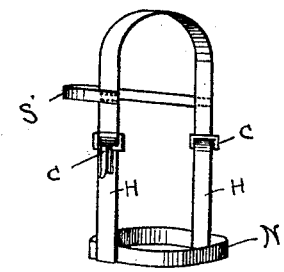

Figure 1 is a perspective of the poke and attachments. Fig. 2 shows the poke adjusted to the head. Fig. 3 shows the connection of poke A and yoke B. Fig. 4 is a perspective of the halter to which the poke is secured.

A is the poke and is a long piece of spring steel curving toward its lower end. Its upper end is screw threaded and adapted to screw into the hole B' in the yoke B.

B is a metal yoke adapted to pass each side of an animal's mouth, side of the cheeks. It is provided with a nose piece E, connected to each arm of the yoke, which is shown as a chain, its use hereinafter described. It is also provided with a chop strap D connected to each arm of the yoke above the nose piece E and adapted to fit under the head at about the chops of the animal.

C. C. are hooks secured to the halter H on the cheek strap on each side thereof, and are adapted to engage or hook into the eyes *l* in the ends of the yoke B. A series of eyes *l* on each side of the yoke is shown, and are used in adjusting the yoke to different sized heads.

H. H is the halter. An ordinary halter may be used by providing means for securing the hooks C C to the cheek straps.

The poke being made of spring steel, it will be impossible for the animal to throw down or jump a fence, for the reason that the poke being bent forward, will strike the fence before the animal reaches it, and will when pressed against, cause the chain E to be pressed against the nose of the animal and with the spring or recoil of the steel check him, or if coming at some speed, will throw him backward. When the animal is feeding the bow of the poke will rest upon the ground in front of him.

Having thus described my invention, what I claim as new, and desire to secure by Letters Patent, is—

In an animal poke, the combination with an ordinary halter for animals, and hooks C, C, secured to the cheek straps of the halter, of the yoke B, its arms provided with a series of holes, I, I, for engaging the hooks C, C, and provided also with a screw threaded hole B' in the center of the yoke, and provided also with means for securing the chop strap D and the nose chain E to the arms of the yoke, the removable spring poke A, having one end screw threaded and adapted to screw into the screw threaded hole B' in the center of the yoke, the chop strap D secured to the arms of the yoke and passing underneath the lower jaw of the animal to prevent the yoke from swinging, and the nose chain E passing over the nose of the animal above the nostrils, and pressing on the nostrils when a strain is brought upon the yoke, substantially as and for the purpose set forth.

In testimony whereof I affix my signature in presence of two witnesses.

FERDINAND FISHER.

Witnesses:
  A. H. SWARTHOUT,
  FANNIE ROBBINS.